United States Patent
Halepovic et al.

(10) Patent No.: US 11,431,780 B2
(45) Date of Patent: Aug. 30, 2022

(54) METHOD AND APPARATUS FOR ESTIMATING QUALITY OF EXPERIENCE FROM NETWORK DATA

(71) Applicants: AT&T Intellectual Property I, L.P., Atlanta, GA (US); GEORGIA TECH RESEARCH CORPORATION, Atlanta, GA (US)

(72) Inventors: Emir Halepovic, Somerset, NJ (US); Tarun Mangla, Chicago, IL (US); Ellen Zegura, Decatur, GA (US); Mostafa Ammar, Smyrna, GA (US)

(73) Assignees: AT&T Intellectual Property I, L.P., Atlanta, GA (US); GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 17/079,907

(22) Filed: Oct. 26, 2020

(65) Prior Publication Data

US 2022/0131922 A1   Apr. 28, 2022

(51) Int. Cl.
*H04L 65/80*   (2022.01)
*H04L 65/61*   (2022.01)

(52) U.S. Cl.
CPC .......... *H04L 65/80* (2013.01); *H04L 65/4069* (2013.01)

(58) Field of Classification Search
CPC ..... H04L 65/80; H04L 65/4069; H04L 29/06; H04L 65/61

USPC ..................... 709/224, 223; 370/252; 714/39
See application file for complete search history.

(56) References Cited

U.S. PATENT DOCUMENTS

| | | | |
|---|---|---|---|
| 2016/0080230 A1* | 3/2016 | Anand | H04L 47/32 709/224 |
| 2017/0237777 A1* | 8/2017 | Joch | H04L 63/1408 713/152 |
| 2018/0307712 A1* | 10/2018 | Baradaran | H04L 43/0823 |
| 2020/0366572 A1* | 11/2020 | Chauhan | H04L 41/5009 |
| 2021/0004275 A1* | 1/2021 | Avagyan | G06F 9/45558 |
| 2021/0204011 A1* | 7/2021 | Jain | H04N 21/23439 |
| 2021/0211479 A1* | 7/2021 | Trim | H04L 67/26 |

* cited by examiner

*Primary Examiner* — Tonia L Dollinger
*Assistant Examiner* — Mehulkumar J Shah
(74) *Attorney, Agent, or Firm* — Guntin & Gust, PLC; Douglas Schnabel

(57) ABSTRACT

Aspects of the subject disclosure may include, for example, selecting a first video service model according to a server hostname determined according to transport layer security (TLS) transaction data associated with a video session transmitted over a network, calculating a plurality of data delivery statistics from the TLS transaction data according to the first video service model, where the plurality of data delivery statistics includes session-level statistics over the video session, transaction-level statistics over each transaction, and temporal feature statistics over intervals of the video session, determining a quality of experience (QoE) metric for the video session from the plurality of data delivery statistics according to a course-grained data QoE model, and adjusting a first network element of the network responsive to the determining the QoE metric for the video session. Other embodiments are disclosed.

20 Claims, 24 Drawing Sheets

SUMMARY OF FEATURES MEASURED

| Type | Statistic | Features |
|---|---|---|
| Session level | single value | SDR_DL, SDR_UL, SES_DUR, TRANS_PER_SEC |
| Transaction Statistics | MIN, MED (median), MAX | DL_SIZE, UL_SIZE, DUR, TDR, D2U, LAT |
| Temporal Statistics | interval based | CUM_DL_XXs, CUM_UL_XXs |

FIG. 2D

Confusion Matrix: Svc1, Combined QoE

| Actual | # sessions | Predicted | | |
|---|---|---|---|---|
| | | low | med | high |
| low | 632 | 72% | 21% | 8% |
| med | 599 | 25% | 43% | 32% |
| high | 880 | 5% | 12% | 84% |

FIG. 2L

Accuracy (A), Recall (R), and Precision (P) values for r different feature sets

| Feature set | Svc1 | | | Svc2 | | | Svc3 | | |
|---|---|---|---|---|---|---|---|---|---|
| | A | R | P | A | R | P | A | R | P |
| Only Session-level (SL) | 58% | 61% | 60% | 66% | 68% | 63% | 66% | 77% | 66% |
| SL + Transaction Stats (TS) | 65% | 72% | 67% | 69% | 77% | 68% | 71% | 84% | 74% |
| SL + TS + Temporal Stats | 69% | 73% | 71% | 71% | 78% | 71% | 73% | 85% | 75% |

FIG. 2M

| Service | Accuracy | Recall | Precision |
|---------|----------|--------|-----------|
| Svc1 | 74% (+5%) | 82% (+9%) | 73% (+2%) |
| Svc2 | 78% (+7%) | 85% (+7%) | 76% (+5%) |
| Svc3 | 78% (+5%) | 89% (+4%) | 78% (+3%) |

Accuracy using packet traces and ML16. Parenthesis values report gain compared to TLS transaction data

FIG. 2Q

Transaction Identification Accuracy

| Actual | # Trans-actions | Predicted Existing | Predicted New |
|---|---|---|---|
| Existing | 13269 | 98% | 2% |
| New | 1545 | 11% | 89% |

FIG. 2R

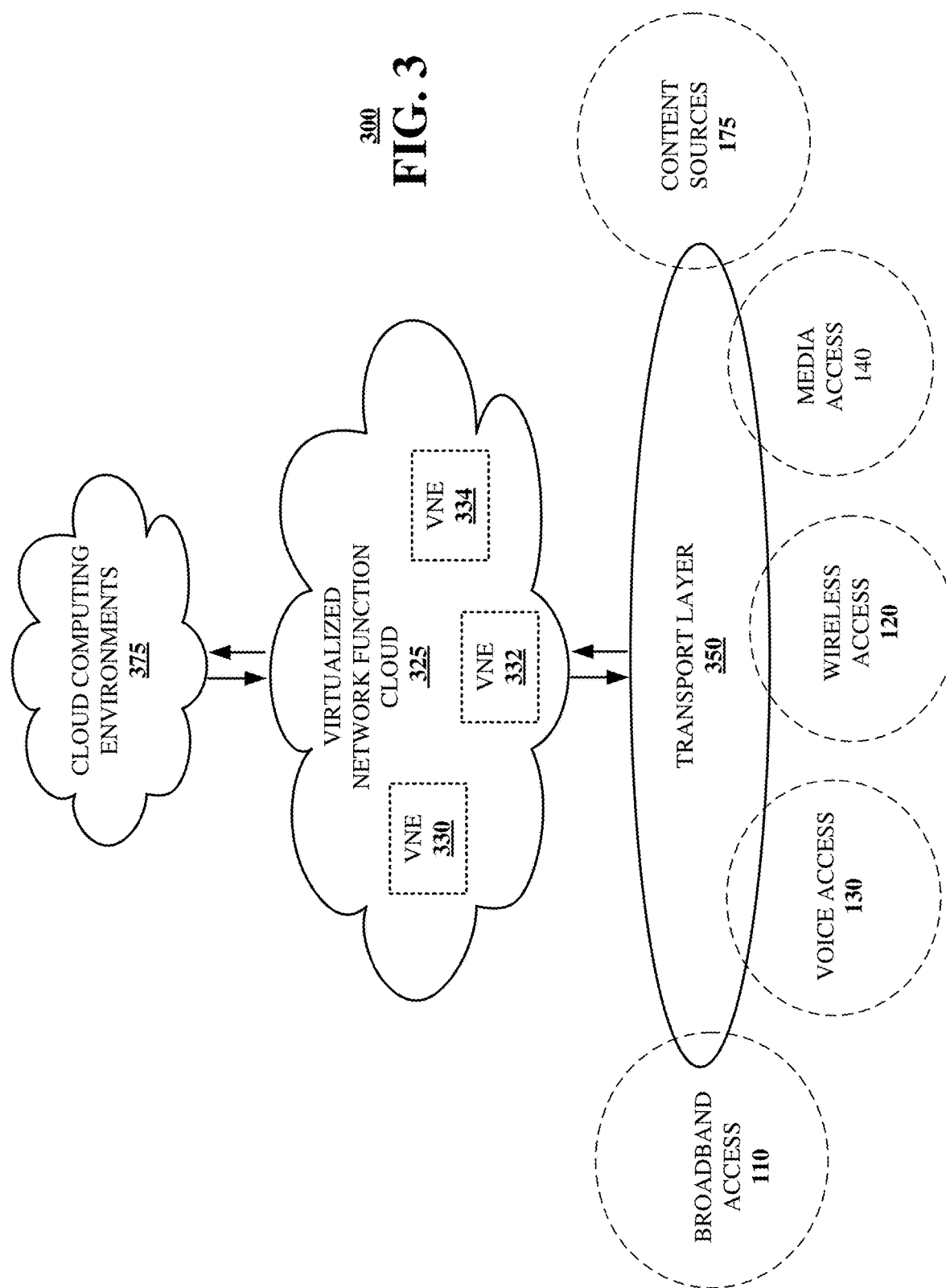

US 11,431,780 B2

METHOD AND APPARATUS FOR ESTIMATING QUALITY OF EXPERIENCE FROM NETWORK DATA

STATEMENT REGARDING FEDERALLY SPONSORED RESEARCH OR DEVELOPMENT

This invention was made with government support under NSF 1909040 awarded by the National Science Foundation. The government has certain rights in the invention.

FIELD OF THE DISCLOSURE

The subject disclosure relates to a method and an apparatus for estimating quality of experience from network data.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein:

FIG. 2D depicts an illustrative embodiment of data delivery statistical features determined from the TLS transactions for video sessions.

FIG. 2L depicts an illustrative embodiment of confusion matrix data calculated via a QoE model using TLS transaction data.

FIG. 2M depicts an illustrative embodiment of accuracy, recall, and precision values for various statistical feature sets as calculated via a QoE model using TLS transaction data.

FIG. 2Q depicts an illustrative embodiment of accuracy, recall, and precision values as calculated using packet traces and as calculated via a QoE model using TLS transaction data.

FIG. 2R depicts an illustrative embodiment of confusion matrix values calculated via a QoE model using TLS transaction data with a session identification heuristic to identify back-to-back video sessions.

FIG. 3 is a block diagram illustrating an example, non-limiting embodiment of a virtualized communication network in accordance with various aspects described herein.

DETAILED DESCRIPTION

Figure 1:
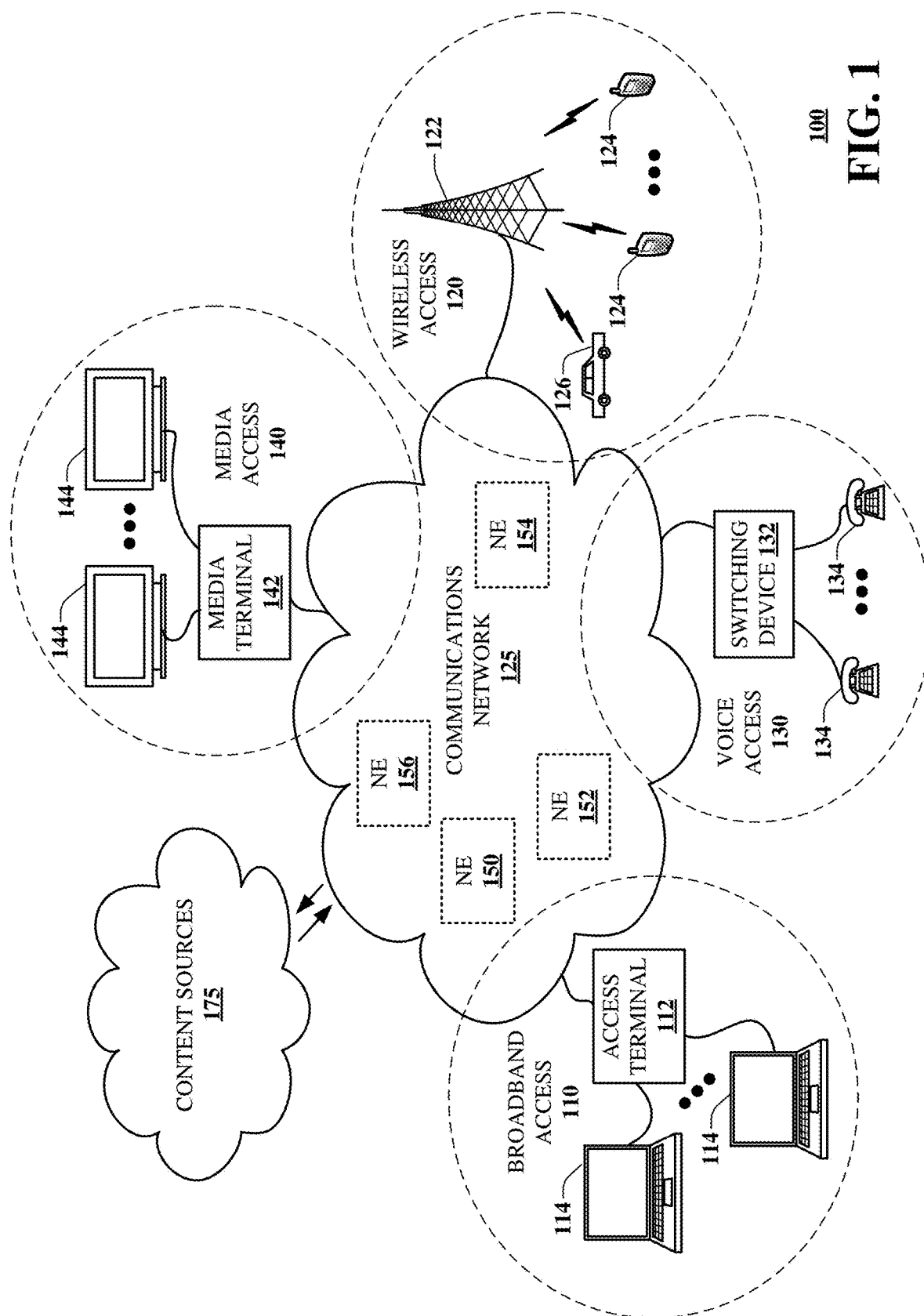
FIG. 1 is a block diagram illustrating an exemplary, non-limiting embodiment of a communications network in accordance with various aspects described herein.

The subject disclosure describes, among other things, illustrative embodiments for determining a QoE metric for a video session based on TLS transaction data. TLS transaction data for a video session delivered over a network can be collected. Data delivery statistic can be calculated from the TLS transaction data. A server hostname of a streaming service can be determined from the TLS transaction data and can be used to select a QoE model. A QoE metric can be determined for the video session from the data delivery statistics via the first QoE model. The QoE metric can be used to detect a data capacity issue for the network during the video session. A first network element of the network can be adjusted based on the data capacity issue. Other embodiments are described in the subject disclosure.

One or more aspects of the subject disclosure include a method, performing operations by processing system including a processor. The method can include collecting, by a processing system including a processor, transport layer security (TLS) transaction data associated with a video session transmitted over a network. The method can further include calculating a plurality of data delivery statistics from the TLS transaction data. The plurality of data delivery statistics can include session-level statistics over the video session, transaction-level statistics over each transaction, and temporal feature statistics over intervals of the video session. The method can also include determining from the TLS transaction data, a server hostname associated with the video session and, in turn, selecting a first quality of experience (QoE) model according to the server hostname. The method can include determining a QoE metric for the video session from the plurality of data delivery statistics according to the first QoE model. The QoE metric comprises a low level of QoE or a high level of QoE. The first QoE model can be trained via machine learning. The method can also include determining a data capacity issue for the network during the video session according to the QoE metric and, in turn, adjusting a first network element of the network responsive to the determining the data capacity issue for the network.

One or more aspects of the subject disclosure include a device, including a processing system including a processor and a memory that stores executable instructions that, when executed by the processing system, facilitate performance of operations. The operations can include calculating a plurality of data delivery statistics from transport layer security (TLS) transaction data associated with a video session transmitted over a network. The plurality of data delivery statistics can include session-level statistics over the video session, transaction-level statistics over each transaction, and temporal feature statistics over intervals of the video session. The operations can also include determining, from the TLS transaction data associated with the video session, a server hostname associated with the video session, and, in turn, selecting a first quality of experience (QoE) model according to the server hostname. The operations can further include determining a QoE metric for the video session from the plurality of data delivery statistics according to first QoE model. The QoE metric can include a low level of QoE or a high level of QoE. The operations can include adjusting a first network element of the network responsive to the determining the QoE metric for the video session.

One or more aspects of the subject disclosure include a machine-readable medium, comprising executable instructions that, when executed by a processing system including a processor, facilitate performance of operations. The operations can include calculating a plurality of data delivery statistics from transport layer security (TLS) transaction data associated with a video session transmitted over a network. The plurality of data delivery statistics can include session-level statistics over the video session, transaction-level statistics over each transaction, and temporal feature statistics over intervals of the video session. The operations can also include selecting a first quality of experience (QoE) model according to a server hostname determined according to the TLS transaction data associated with the video session transmitted over the network. The operations can further include determining a quality of experience (QoE) metric for the video session from the plurality of data delivery statistics according to the first QoE model. The operations can include adjusting a first network element of the network responsive to the determining the QoE metric for the video session.

Referring now to FIG. 1, a block diagram is shown illustrating an example, non-limiting embodiment of a system 100 in accordance with various aspects described herein. For example, system 100 can facilitate in whole or in part determining a QoE metric for a video session based on TLS transaction data. TLS transaction data for a video session delivered over a network can be collected. Data delivery statistic can be calculated from the TLS transaction data. A server hostname of a streaming service can be determined from the TLS transaction data and can be used to select a QoE model. A QoE metric can be determined for the video session from the data delivery statistics via the first QoE model. The QoE metric can be used to detect a data capacity issue for the network during the video session. A first network element of the network can be adjusted based on the data capacity issue.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
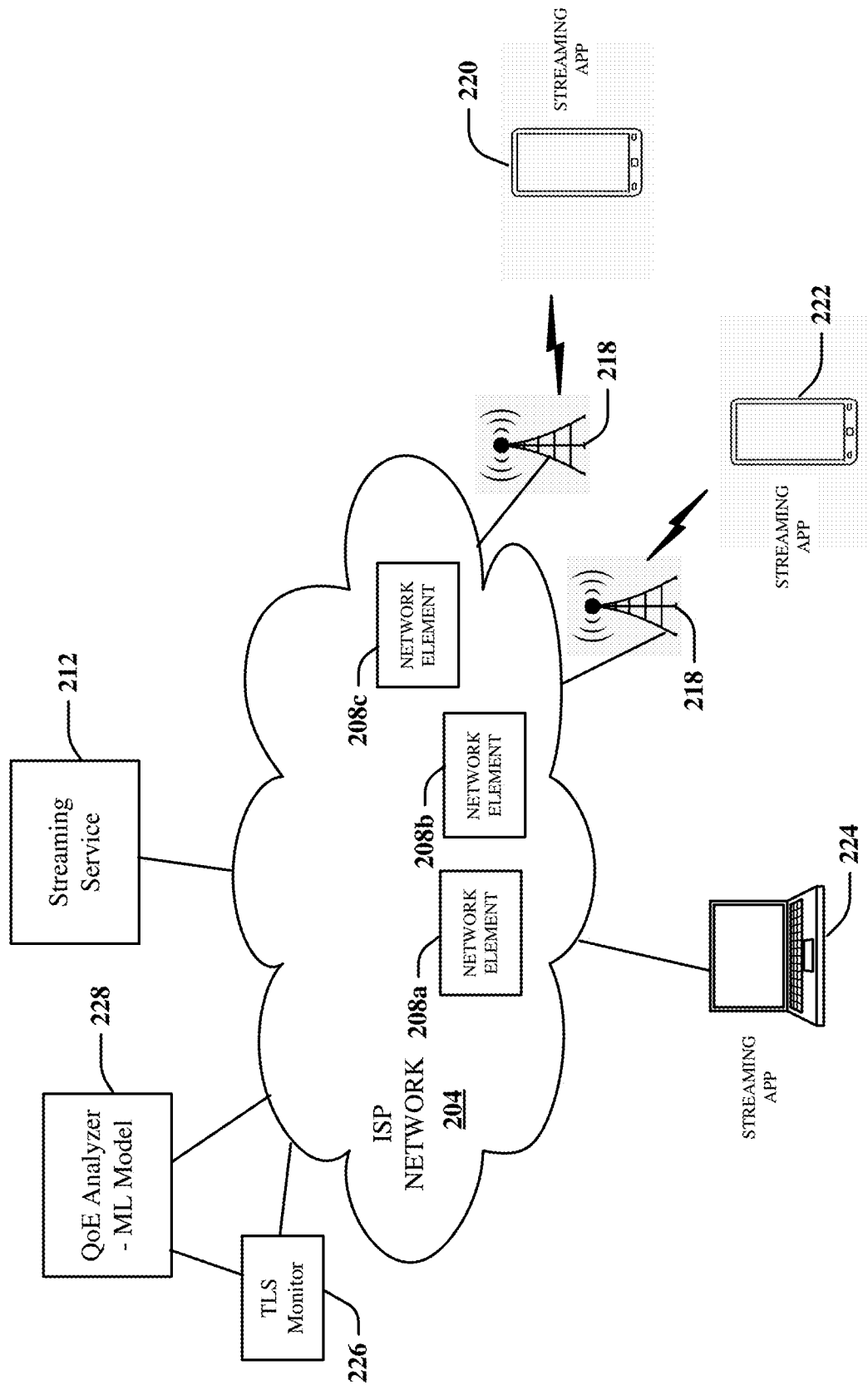
FIG. 2A is a block diagram illustrating an example, non-limiting embodiment of a system for of FIG. 1 in accordance with various aspects described herein.

FIG. 2A is a block diagram illustrating an example, non-limiting embodiment of a system 200 functioning within the communication network of FIG. 1 in accordance with various aspects described herein. In one or more embodiments, the system 200 can facilitate determining a QoE metric for a video session based on TLS transaction data. The system 200 can include an Internet Service Provider (ISP) network 204 including various network elements 208a-c for providing services to user devices can include a streaming video service 212 executing at, for example, a server. The system can also include a streaming video application executing at, for example, user devices 220-224. In one or more embodiments, the streaming video service 212 can stream content to the user devices 220-224 via a wired (Ethernet) connection or a wireless connection, such as a wireless local area network (LAN) or a wireless network including cellular base stations.

In one or more embodiments, the system 200 can include a TLS monitor 226. The TLS monitor 226 can collect aggregate statistics from passive traffic monitoring of the ISP network 204. For example, the TLS monitor 226 can be a transparent proxy which can capture encrypted network traffic data in TLS transactions, including TLS transactions associated with the streaming service 212. The TLS monitor can also inspect unencrypted TLS headers in these TLS transactions.

In one or more embodiments, the system 200 can include a QoE analyzer 228. The QoE analyzer 228 can include machine learning (ML) models, or QoE models, for analyzing the TLS transaction data collected by the TLS monitor 226. The QoE analyzer 228 can calculate a feature set of TLS data statistics from the TLS transaction data. The QoE analyzer can review unencrypted header data from the TLS transaction data to determine if the TLS transaction data was generated by a particular hostname that has been previously associated with a streaming service 212.

In one or more embodiments, once the streaming service 212 is identified, the QoE analyzer can select a particular QoE model corresponding to a particular streaming service 212. The particular QoE model can take into account empirically observed characteristics of a particular streaming service 212 and a streaming application corresponding to this service that is operating at the receiving device 220. The QoE analyzer can use the QoE model to calculate QoE metrics based on the feature set of TLS data statistics derived from the TLS transaction data. The QoE metrics calculated by the QoE analyzer can estimate QoE levels that were experienced by a user of the device 220 as it received and reproduced a streamed video from the streaming server 212.

In one or more embodiments, the QoE metrics can be used to detect if there were data capacity issues on the ISP network 204 during the video session. If a data capacity issue is detected, then the QoE analyzer 228 can respond by, for example, directing the ISP network 204 to adjust a network element 208c to mitigate the data capacity issue. For example, the QoE analyzer 228 can direct the network 204 to adjust a configuration of a router or add/subtract a router (or a virtual router) from the network. In another example, the QoE analyzer 228 can direct the network 204 to alter a data path to improve the capacity issue.

In one or more embodiments, network measurement data can be used to estimate video QoE. Typical mechanisms can access packet-level traces, which are the most-detailed data available from the network. However, collecting packet-level traces can be challenging at a network-wide scale and can require substantial resources. However, estimating video QoE by means of lightweight, readily available, but coarse-grained network data, requires far fewer resources. TLS transactions can be collected using a standard proxy and can be processed via a machine learning-based methodology to estimate video QoE. It is found that the QoE model can demonstrate excellent estimation accuracy. The QoE model based on TLS transactions has been used to estimate QoE metrics for three of the most popular streaming services. The QoE model has been found to achieve accuracy as high as 72% and recall rates as high as 85% in the prediction of low QoE (e.g., low video quality or high re-buffering) instances. By comparison, QoE estimation methods using packet traces demonstrate 7% better accuracy estimation and 9% better recall estimation. However, packet trace methods are found to require up to 60 times higher computation overhead.

Last-mile ISPs need to efficiently provision and manage their networks to meet the growing demand for Internet video. This network optimization requires ISPs to have an in-depth understanding of end-user video QoE. Understanding video QoE is, however, challenging for ISPs as they generally do not have access to streaming applications at end-user devices 220. This issue is further exacerbated by an increasing use of end-to-end encryption, which significantly limits the information that ISPs can obtain from their network traffic for use in estimating video QoE. ISPs are thus constrained to rely on their limited view of the network data to estimate video QoE metrics.

Figure 2B:
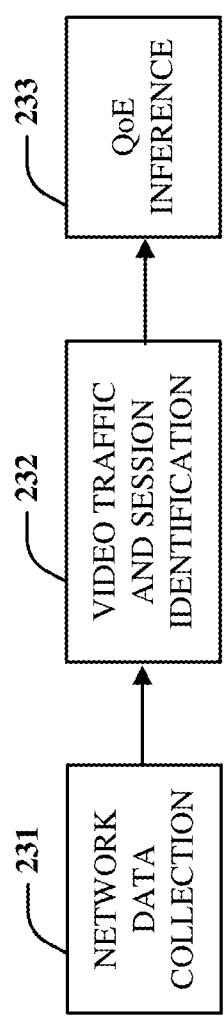
FIG. 2B depicts an illustrative embodiment of a method in accordance with various aspects described herein.
Figure 2C:
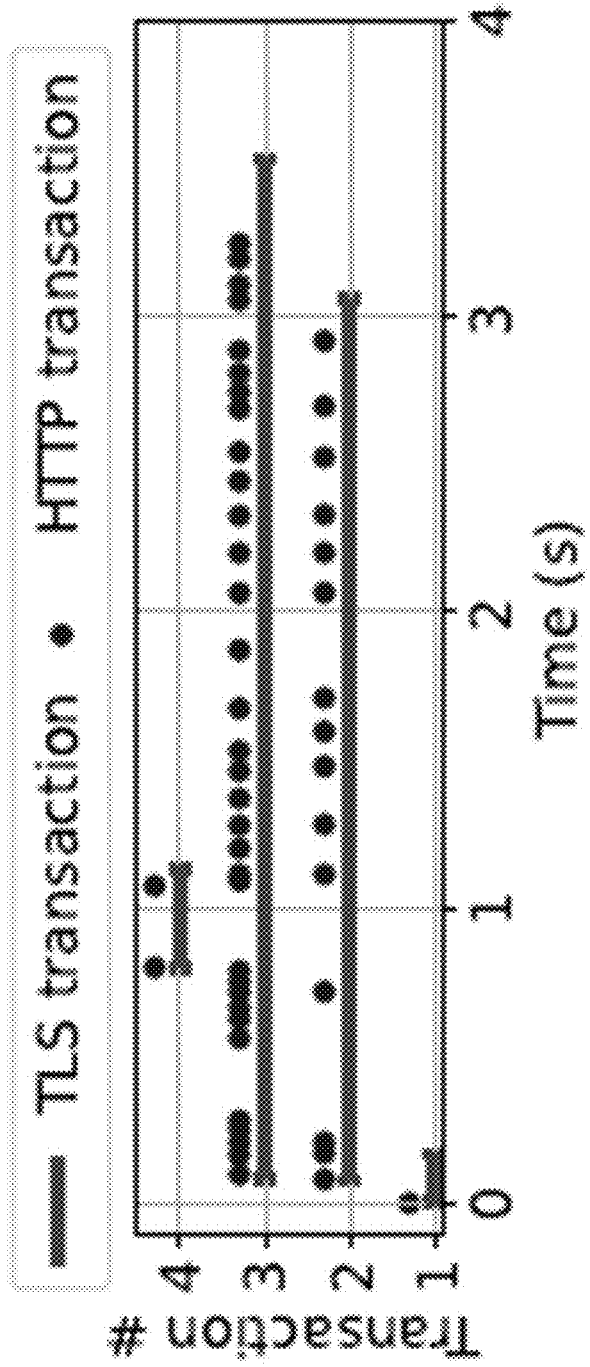
FIG. 2C depicts an illustrative embodiment of transport layer security (TLS) transactions and hypertext transfer protocol (HTTP) transactions during a streaming service session.

Referring now to FIG. 2B, an illustrative embodiment of a method in accordance with various aspects described herein is illustrated. The video QoE estimation method using network data primarily consists of three steps. In step 231, network data can be collected using a monitoring tool. In step 232, video traffic and video sessions can be identified from the collected data. In step 233, iii) estimating session QoE metrics for the video session can estimated using methods designed for this purpose. Prior efforts at QoE estimation mechanisms have focused on mechanisms that assume access to packet traces, the most granular network data. However, collecting and processing packet-level data from the entire network is challenging because of the scale of ISP networks and is very resource intensive. At the same time, it is important for ISPs to understand network-wide video performance for efficient management and provisioning, especially in the case of capacity-constrained and highly heterogeneous cellular networks. This makes it challenging to use existing, packet trace based, QoE estimation mechanisms in practice.

One possible approach QoE estimation that avoids direct packet trace inspection is to develop flexible telemetry systems that provide the most useful metrics (e.g., HTTP transactions) that are required for QoE inference by in-network processing of the packet data. However, this approach requires significant modifications to existing measurement systems. In addition, flexible telemetry systems include practical challenges, such as limited measurement resources and budgets, where the systems are constraint by the fact that the same network data is often used for multiple purposes (e.g., security, performance), and limited flexibility, as the monitoring tools are provided by vendors.

To overcome these challenges, in one or more embodiments, a system and method for detecting video performance issues with lightweight, readily available but coarse-grained network data. In practice, ISPs already collect coarse-grained data using standard telemetry systems for different network management functions. This data can be used to estimate coarse-grained QoE metrics. For example, QoE metrics of "low quality" and "high quality" can be generated in a lightweight manner and used to identify parts of the network that underperform. This approach can enable adaptive video performance monitoring, where an ISP collects and analyzes performance via course-grained data and, in turn, uses focused, fine-grained data collection and analyze to troubleshoot problematic locations for further diagnosis.

In one or more embodiments, a QoE analyzer can access coarse-grained network data, such as Transport Layer Security (TLS) transaction data. TLS transaction data can clearly be lightweight (i.e., acquired with relatively low overhead) as the number of TLS transactions in a video session are significantly smaller than the number of data packets. For example, there are 1400 times more packets than TLS transaction in the video session dataset used for developing QoE models described herein. TLS transaction data is also readily available. TLS transactions can be collected using, for example, a transparent proxy (e.g., Squid™). Moreover, video traffic can be easily identified from headers included in TLS transaction data. A major challenge, however, is delimiting video sessions in which a user has watched back-to-back videos from the same streaming service. It is found that correct video session identification can be important for facilitating accurate QoE estimation due to changes in streaming patterns over the course of a video session and due to corresponding traffic within a video session as it progresses.

In one or more embodiments, the QoE model can use TLS transaction data to detect video performance issues via categorical estimation of key video QoE metrics, such as, video quality, re-buffering ratio and a combined QoE metric that jointly considers the two individual metrics. A machine learning (ML)-based approach has applied to generate a QoE model based on data collected under diverse emulated network conditions. TLS transaction data collected during video sessions of three streaming services, YouTube™, Netflix™, and Hulu™ has been used to train the QoE model. Estimation accuracy for the QoE model has been evaluated by comparing predicted QoE results generated with the TLS transaction data against predictions developed by analyzing packet traces. A heuristic has been developed to distinguish consecutive video sessions from the same video service by leveraging TLS transaction arrival and server access patterns.

It is found that TLS transaction data can be used in a QoE model to estimate a combined QoE metric with an accuracy of up to 72% to detect low QoE (low video quality or high re-buffering) instances with a recall of between 73%-85%. The TLS transaction data approach is only 7%-9% less accurate than using data from packet. However, the packet trace approach requires 1400 times more memory overhead and 60 times more computational overhead. It is further found that the session identification heuristic can accurately identify 89% of consecutive video sessions.

It is found that most of the video streamed over the Internet is transmitted using a class of techniques, called HTTP-based Adaptive Streaming (HAS). HAS dynamically adapts video quality based on network conditions. In HAS, the video is divided into segments with each segment encoded into a pre-defined set of quality levels. A player at the client, which is typically a client-side application from the streaming service, downloads the video segments by sending HTTP requests. The quality of the downloaded segments that the user experiences is largely determined by an adaptation algorithm used in the player.

In one or more embodiments, the user's QoE can be impacted by a variety of factors, including, re-buffering, video quality, startup delay, and quality variations. These factors are objective QoE metrics that describe the user's viewing experience during the video streaming session. These QoE metrics can be estimated based on an inference approach. There are two general ways of inferring or estimating the QoE metrics: fine-granular and per-session. Fine-granular requires estimation of QoE metrics periodically within a session. Per-session estimation only estimates QoE metrics once for the entire session. The QoE estimation granularity of an approach is clearly impacted by the granularity of the input network data.

In one or more embodiments, categorical QoE estimates (i.e, low, medium, and high QoE) of per-session video QoE metrics are generated using coarse-granular TLS transaction data. These categorical estimates can enable and ISP to identify video performance issues in a lightweight manner from a system memory and processing standpoint. The following key video QoE metrics are estimated: (1) Re-buffering ratio (rr), (2) Video quality, and (3) Combined QoE.

In one or more embodiments, Re-buffering ratio (rr) can be defined as a stall time for video playback in proportion to a total playback time for the video playback. Re-buffering ratio can measure the severity of stalls during a video session. Re-buffering can be classified into the following three categories: (1) zero, if there are no stalls, (2) mild, if $0 < rr \leq 2\%$, and (3) high, otherwise.

In one or more embodiments, Video quality can be one or more discrete quality levels. In HAS, videos are typically encoded into discrete quality levels with more bits typically required to encode higher video quality. These HAS quality levels tend to be the same for a video service (e.g., Netflix™) and streaming protocol (e.g., HLS, DASH) combination. In one embodiment, quality thresholds can be set, and quality levels can be categorized as low, medium, and high. The video quality of a session can defined as a majority category of the quality level played in the video session. In case of a tie between categories (e.g., equal amounts of high level and medium level), then the lower category can be selected as a matter of policy (or, conversely, the higher level).

In one or more embodiments, Combined QoE can be defined as jointly considering individual QoE metrics. There are several ways to combine the individual metrics. In one embodiment, the Combined QoE can be the minimum category of the two QoE metrics. For example, if a video session had zero rebuffering but low video quality, then its Combined QoE can be assigned to "low." Conversely, the Combined QoE can be the maximum category of the two QoE metrics. Thus, for each session the categorical values of video quality, re-buffering ratio, and combined QoE can be estimated for that video session.

It is found that ISPs typically collect different kinds of data from within their network, which includes network device-level data (e.g., SNMP logs) and aggregate statistics from passive traffic monitoring (e.g., NetFlow and Proxy data). However, device-level data cannot be used to even identify video traffic, let alone assess end-user video QoE. However, aggregated network traffic data can be collected with standard monitoring tools for QoE inference. For example, encrypted network traffic data in the form of TLS transactions can be collected using a transparent proxy. The transparent proxy can inspect the unencrypted part of the TLS transactions, and more specifically, the TLS headers. However, the TLS transaction data is coarse-granular. Referring to FIG. 2, the first five seconds of a sample video session is illustrated. In the sample session, TLS transactions are shown, along with corresponding HTTP transactions. A single TLS transaction can contain a multiple and variable number of HTTP transactions. However, it is observed that there can be an average of 12.1 HTTP transactions corresponding to every TLS transaction sessions from a first streaming service (svc1) in the exemplary dataset used herein.

It is further found that correctly delimiting session boundaries using TLS transaction data is difficult, if multiple videos from the same service are watched back-to-back by a user. This is because the active TLS transactions do not always end immediately once the player is closed, but timeout after some duration, leading to overlapping transactions for consecutive sessions. Therefore, a timeout-based approach, where a session boundary is detected if there is no more video traffic for a certain time, does not work. Inaccurate session identification can lead to errors in QoE estimation due to differences in buffering state and steady state network characteristics in HAS. A heuristic based on fine-granular traffic size information may not work with TLS transaction data due to its coarse-granularity. In one or more embodiments, two types of data are readily available from TLS transaction data: 1) start time, end time, uplink size, and downlink size, and 2) Server Name Indicator (SNI) field indicating the server hostname. The former can be used QoE estimation, and the latter can be used for video traffic and session identification.

In an alternative embodiment, flow-level monitoring (e.g., NetFlow™) can be used for obtaining network measurements. It is found that flow record data, including size counters, from Netflow™, can be similar to TLS transaction data, because there is typically a single TLS transaction in a TCP connection. Flow-level monitoring can also provide an option for obtaining periodic summaries from long flows. A major challenge, however, with flow-level monitoring is identification of video traffic, because flow-level monitoring lacks application-layer data. Augmenting flows with DNS information may alleviate this issue.

In one or more embodiments, the QoE estimation problem can be a supervised machine learning problem. The features of QoE are specific to the coarse-granular TLS transaction data based on the semantics of HAS. For example, the TLS transactions corresponding to video traffic can be identified using the SNI field of the TLS transaction header and grouped into sessions. There are three kinds of features constructed from the sequence of TLS transactions of a session: (1) session-level features, transaction-level features, and temporal features.

In one or more embodiments, the session-level features can consist of metrics calculated for the entire session. The session data rate, which is the total data divided by the session duration, can be calculated in both downlink (SDR_DL) and uplink (SDR_UL) directions. In addition, the session duration (SES_DUR) and the number of TLS transactions per second (TRANS_PER_SEC) can also be logged. In one or more embodiments, the transaction-level statistics are statistics confined to each transaction, downlink size (DL_SIZE), uplink size (UL_SIZE), and duration (DUR). Further, three metrics can be calculated for every transaction: (1) Transaction Data Rate (TDR), (2) Downlink-to-Uplink (D2U) ratio, and (3) Inter-arrival time (IAT). The Transaction Data Rate (TDR) can be obtained by dividing the downlink data size by the transaction duration. Note that TDR may not be the same as network throughput, because there can be idle intervals in a TLS transaction with no network activity. However, TDR is still an indicator of network quality as, intuitively, TDR is high if the available bandwidth was high. Downlink-To-Uplink (D2U) ratio can be the ratio of the downlink data to the uplink data. In HAS, the uplink data can typically be an indicator of the number of video segments requested. Hence, D2U ratio can represent the amount of data downloaded per segment. D2U ratio can be a useful indicator of the video quality. Inter-arrival time (IAT) can be the time between transactions and can be used to capture patterns in arrival of transactions. Summary statistics can be generated from the TLS transaction features. In particular, minimum, median, and maximum values can be computer for the six TLS features, to generate a total of 18 features. The Temporal Features can capture the temporal progress of data transfer during a video session. The session can be divided into pre-determined intervals, each starting from the beginning of the session. Cumulative downlink (CUM_DL_XXs) and cumulative uplink data (CUM_UL_XXs) can be calculated for each of these intervals. For transactions that only partially overlap with an interval, its share of downlink and uplink data can be based on the extent of the overlap with the interval. This set of features can be useful in uncovering any temporal variations which may have been masked out in the aggregate transaction statistics.

For example, the following end points can be used for the intervals (in seconds): 30, 60, 120, 240, 480, 720, 960, and 1200. The rationale behind using fine-granular intervals in the beginning is that a session is more likely to be impacted by poor network quality in the beginning because of empty video buffer. These intervals have been found to yield the highest accuracy. However, these intervals can be hyperparameters of the QoE model, can be determined based data observed on each network of an ISP service. In one or more embodiments, a total of 38 (4+18+16) features can be measured for each session to estimate its QoE metrics, as shown in the table in FIG. 2D.

Figure 2E:
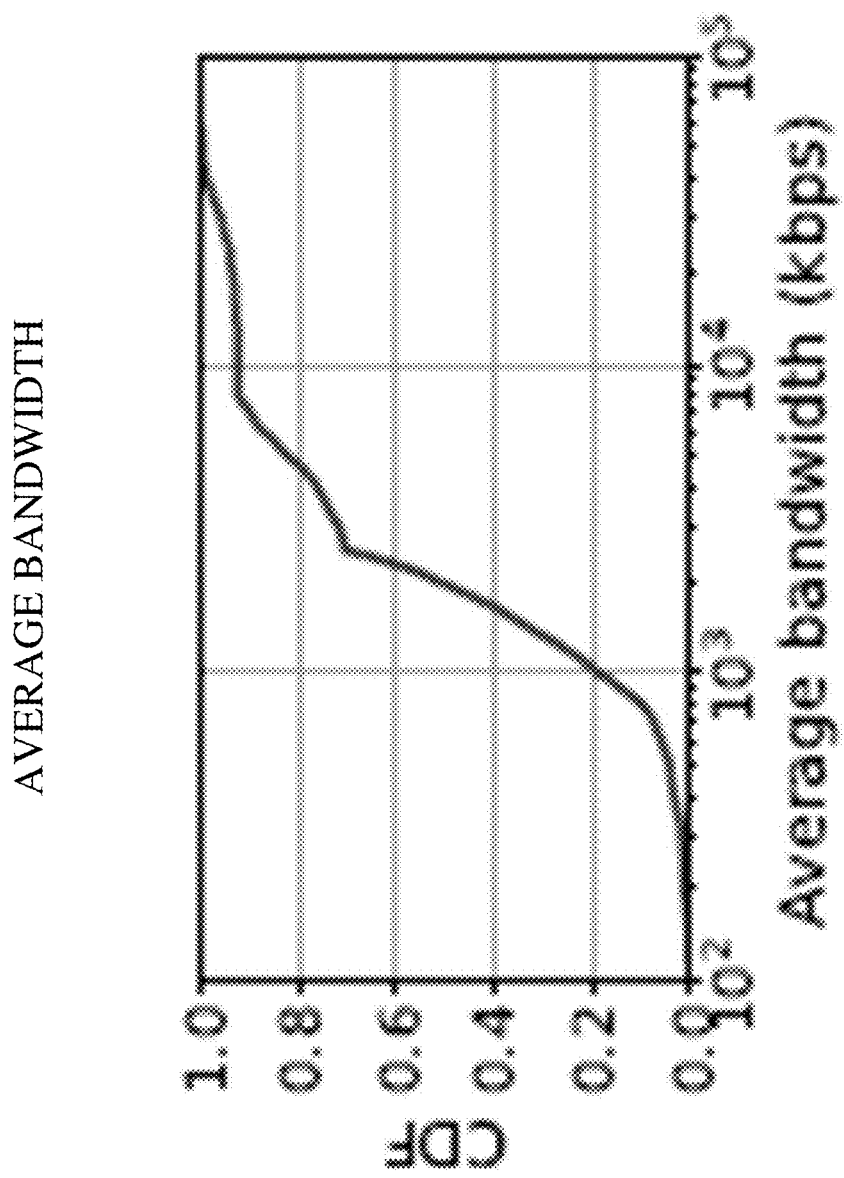
FIGS. 2E-2F depict an illustrative embodiment of a distribution of average bandwidth and duration of traces during video sessions.
Figure 2F:
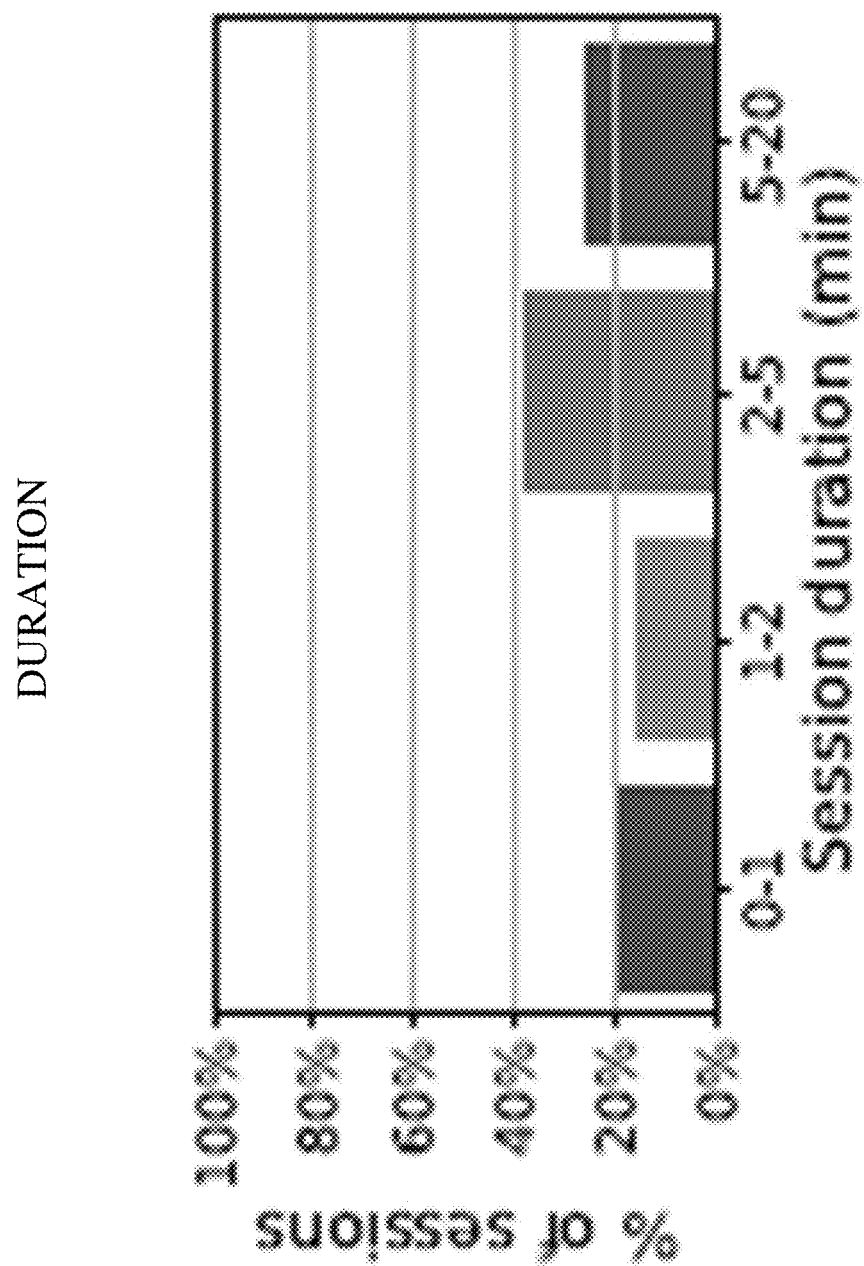

In one or more exemplary embodiments, the QoE estimation accuracy of the QoE model using TLS transaction data has been evaluated and compared to QoE estimates developed from packet traces. A browser-based automation framework was used to collect data for training and testing the QoE model via machine-learning. Video sessions were streamed under emulated network conditions and network data was collected in the form of both packet traces and TLS transactions. The network conditions were emulated using publicly available bandwidth traces representing a diversity of network environments, including fixed broadband, 3G and LTE. Each session was streamed for a duration ranging from 10-1200 seconds. Referring now to FIGS. 2E and 2F, distribution of average bandwidths and duration of the traces for the training data are shown.

TLS transaction data and packet trace data were collected for three popular streaming services, which are denoted as Svc1, Svc2, and Svc3. A list of 50-75 videos was curated for each service, including content from different genres such as animation, sports, and news, if available. Ground truth video QoE metrics were collected each second by injecting Java script functions utilizing an HTML5 Video API to monitor re-buffering and service-specific functions (manually monitored) to monitor video quality. The resulting video quality levels were classified into one of the three categories. Resolution-based thresholds were used for the Svc1 and Svc2 streaming services as these services had a unique resolution per quality level. For the Svc2 streaming service, for example, video resolution of 360p or lower was classified as low, 480p was classified as medium, and 720p or higher was classified as high. By comparison, the quality thresholds for the Svc1 streaming were 288p for low, 480p for medium, and the remaining were tagged as high. For the Svc3 streaming service, only three quality levels were observed in our collected dataset, and these were classified as low, medium, and high. In practice, the video quality thresholds can be set by the ISP based on its target quality. The per-second QoE information was used, here, to obtain categorical values of per-session video quality, re-buffering ratio, and combined QoE.

Figure 2G:
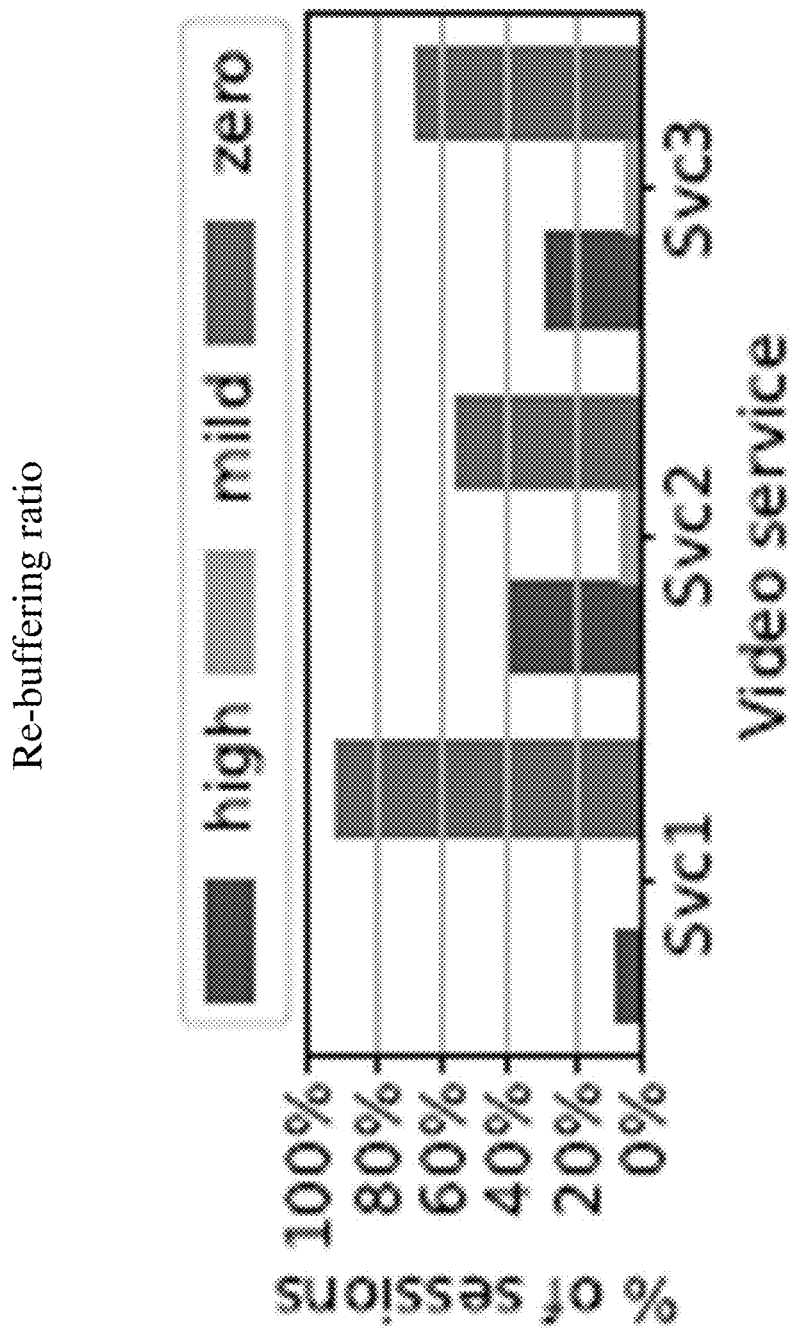
FIGS. 2G-2I depict an illustrative embodiment of quality of experience (QoE) metrics calculated via a QoE model using TLS transaction data.
Figure 2H:
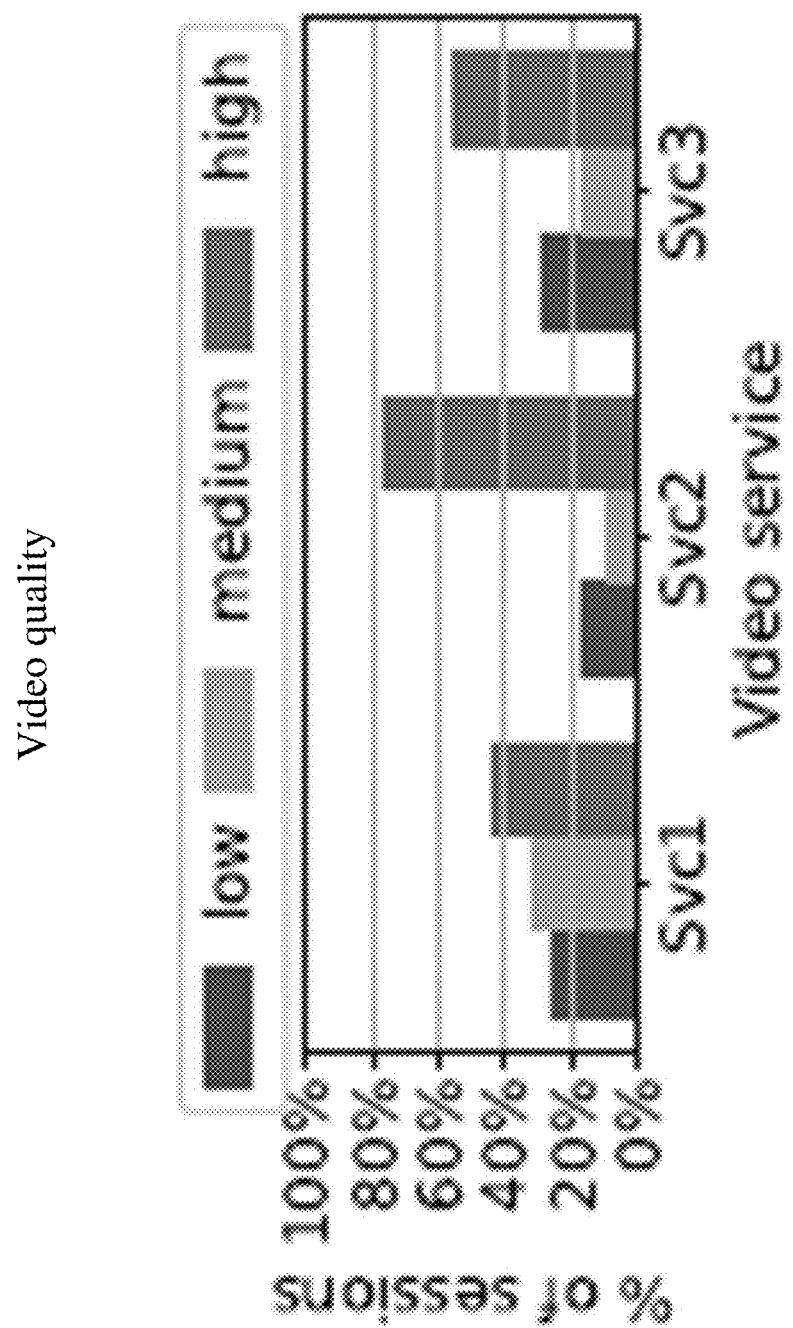
Figure 2I:
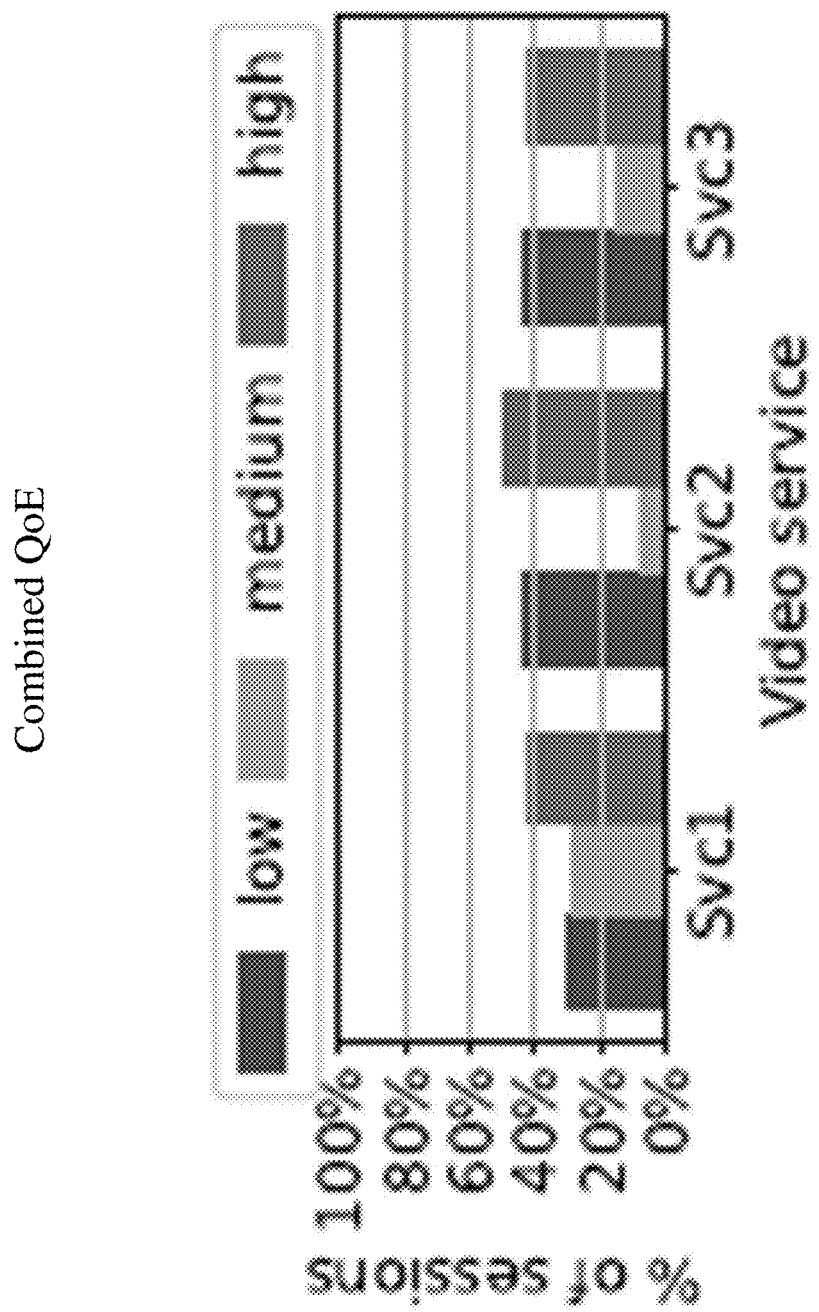

The training dataset included 2,111 video sessions for the Svc1 service, 2,216 video sessions for the Svc2 service, and 1,440 for the Svc3 service. Distributional differences in ground truth QoE metrics for sessions streamed under similar network conditions were observed across the streaming services, as shown in FIGS. 2G-2I. These differences can be attributed to differences in the designs of each of the steaming services. It was found that the Svc1 service used a larger video buffer (240 s) as compared to the other two services. Furthermore, the Svc1 service used a client-side player that attempted to avoid re-buffering by quickly filling the buffer, even at the expense of streaming at low video quality. By contrast, the other two services, especially the Svc2 service, switched to a lower video quality only when the video buffer ran low. Therefore, it was found that poor network conditions often led to low video quality in Svc1 service, whereas the same poor network conditions more often lead to greater re-buffering for the Svc2 service and, to a lessor extent, the Svc3 service.

Figure 2J:
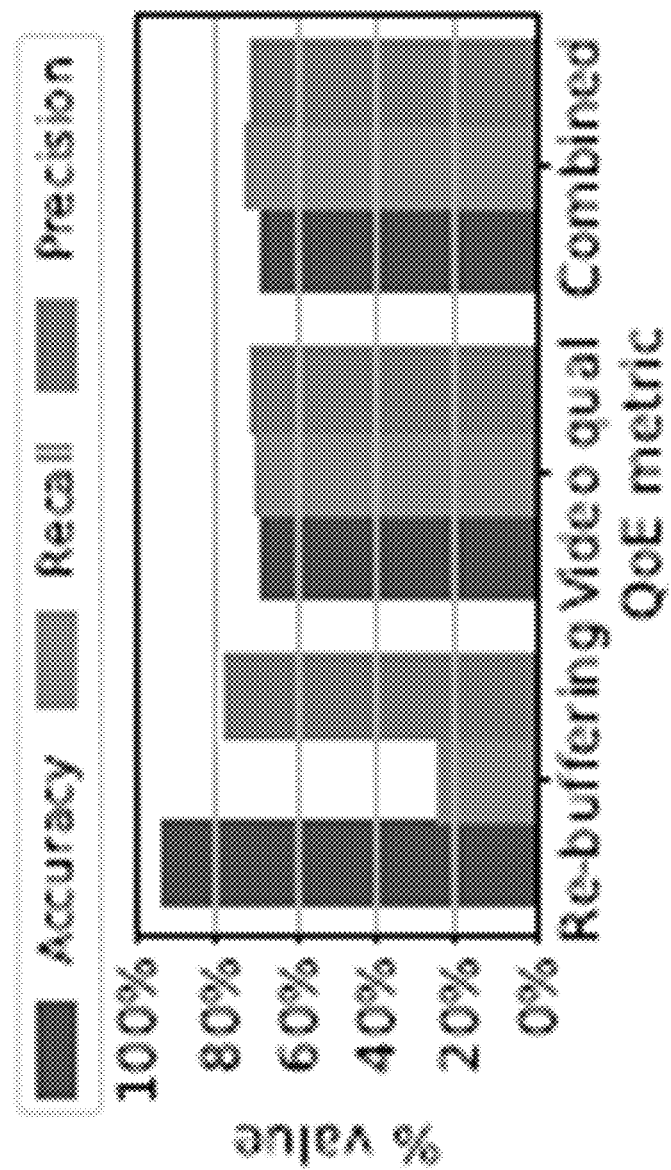
FIGS. 2J-2K depict an illustrative embodiment of accuracy, recall, and precision values for different video streaming services as calculated via a QoE model using TLS transaction data.
Figure 2K:
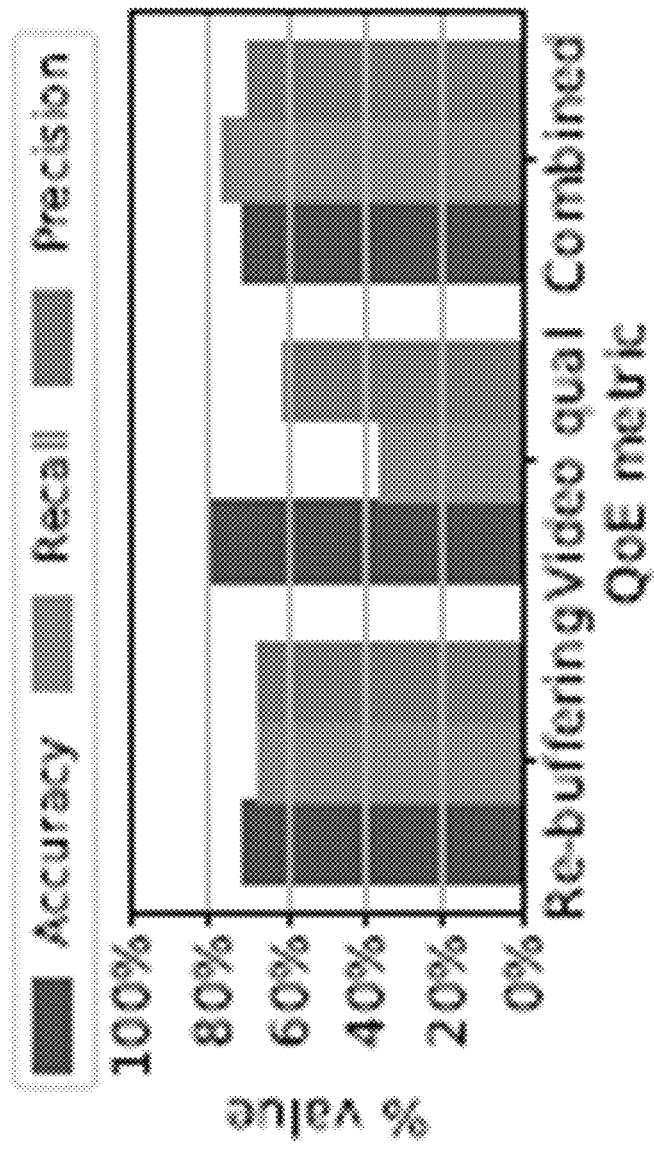

In one or more embodiments, a Python Scikit library was used to train various machine learning QoE models. A 5-fold cross validation was used for evaluating the accuracy of these QoE models. Several ML-based models were evaluated, including SVM, k-NN, XGBoost, Random Forest, and Multilayer Perceptron. It was found that the Random Forest ML-based model yielded the highest accuracy, although the other models could be used in practice. The accuracy of QoE metrics for the low QoE metric class of the Svc1 service is shown in FIG. 2J, while the accuracy of QoE metrics for the low QoE metric class of the Svc2 service is shown in FIG. 2K. It is found that the recall value is particularly important since this is critical for correctly identifying video performance issues. For the Svc1 service, the recall in identifying low video quality sessions was found to be 68%, while the recall in identifying high re-buffering was only 21%, as shown in FIG. 2J. This performance is reversed for the Svc2 service, where the recall for identifying high rebuffering was 71%, while the recall for low video quality was only 40%, as shown in FIG. 2K. Similar results were obtained for the Svc3 service, where a recall of 63% was achieved for high re-buffering and a recall of 58% was achieved for low video quality. In general, it was found that the accuracy metrics achieved via the ML trained QoE models was high for the QoE metric that is more likely to degrade with poor network conditions in a video service. The accuracy metrics were also high for the combined QoE metric, across all three services, which demonstrated recall in identifying low combined QoE of between 73%-85%.

Referring now to FIG. 2L, a confusion matrix is shown for the combined QoE metric as determined for the Svc1 service. Most of the misclassifications the combined QoE happen between neighboring classes (e.g., low classified as medium, high classified as medium). These types of misclassifications are most likely due to the model's limitations in classifying instances that are relatively close to the class thresholds. Naturally, the mis-classification errors are most frequent for sessions with medium QoE, while the sessions with low or high combined QoE can be classified with a high accuracy across all three services.

In one or more embodiments, it is found that coarse-grained, TLS transaction data can be used by ISPs to model QoE during video streaming. The ML trained QoE models can be used to detect video performance issues, such as low combined QoE sessions with a high accuracy. It is further found that certain features in the TLS transaction dataset of features have greater impact that other features in accurately predicting combined QoE. Referring now to FIG. 2M, the accuracy the predicted combined QoE is charted against the incremental addition of features to the model. The lowest recall (accuracy) is found when only session-level features are used in the QoE model. The accuracy improves by 6%-12% as features capturing the transaction statistics and the temporal distribution of data are added to the model. Therefore, in spite of coarse granularity of the TLS transaction data, the ML-trained QoE model can use this data to determine useful predictive information about the QoE of vide sessions.

Figure 2N:
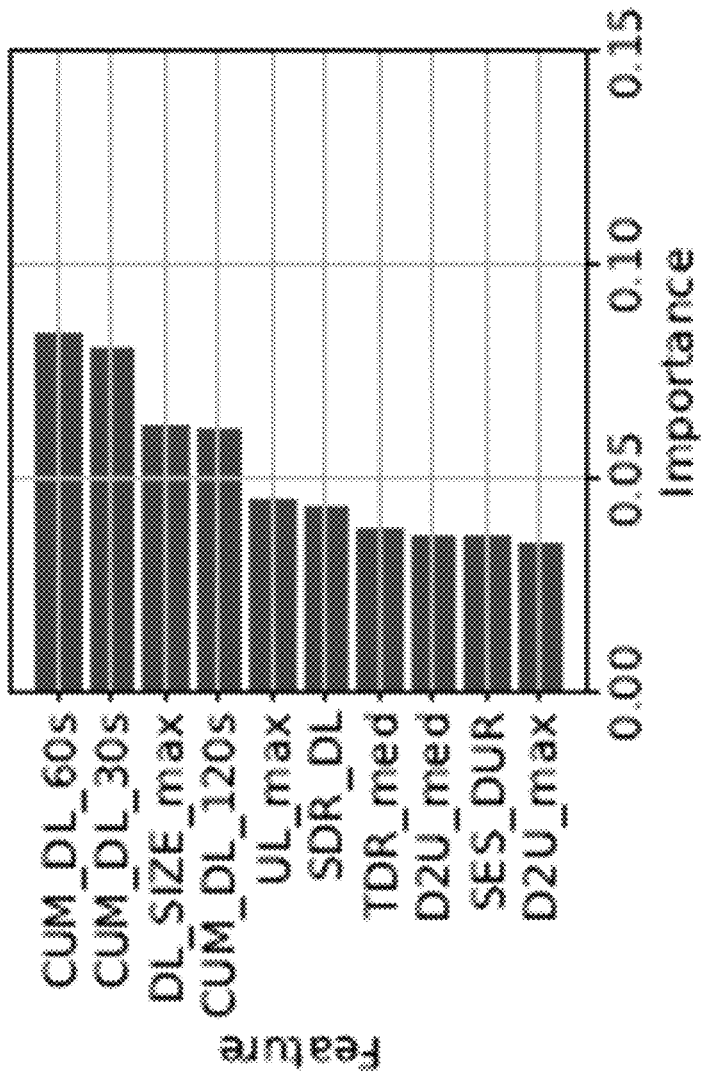
FIGS. 2N-2P depict an illustrative embodiment of top 10 important statistical features for different video streaming services as calculated via a QoE model using TLS transaction data.
Figure 2O:
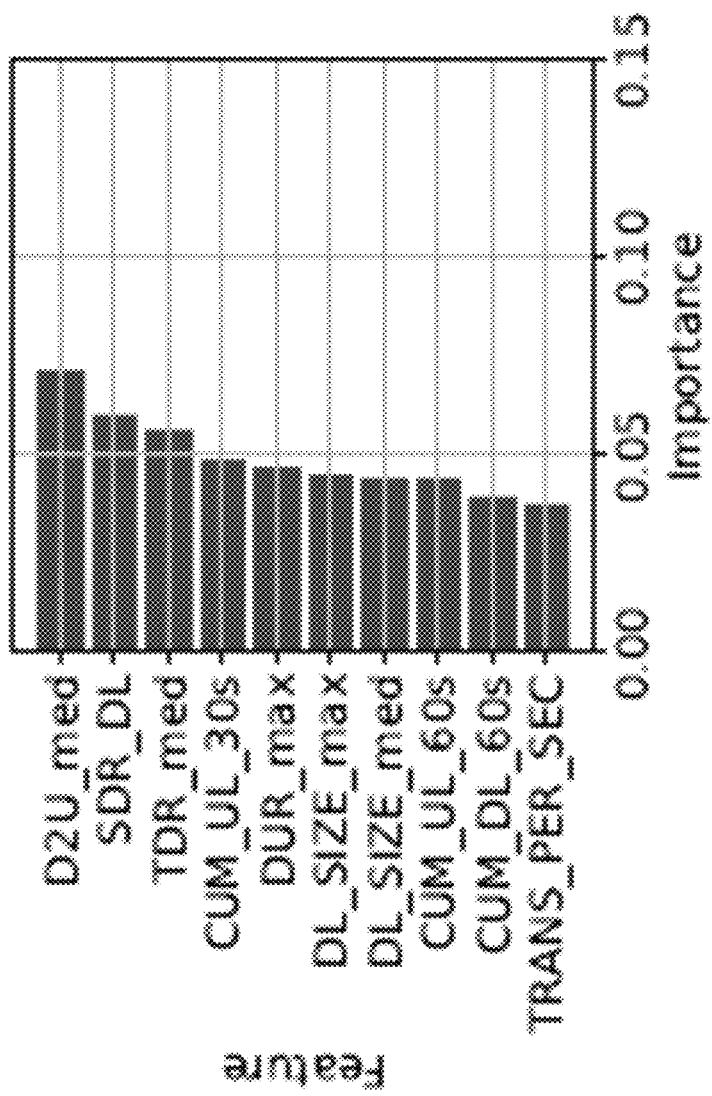
Figure 2P:
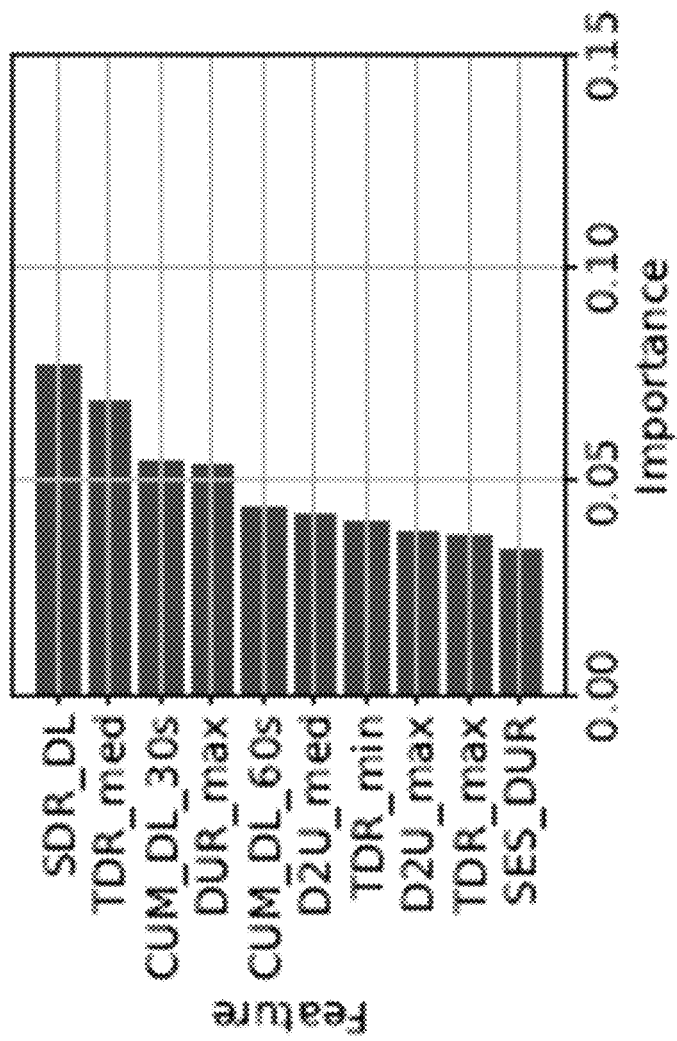

Referring now to FIGS. 2N-P, the ten most important data set features for accurately predicting combined QoE via the QoE model are shown for each of the three streaming services, Svc1, Svc2, and Svc3. Four of these features are found in the top ten list of all three services. These most important features are the downlink session data rate (SDR_DL), the median transaction data rate (TDR_MED), the median D2U ratio (D2U MED), and the cumulative downlink data in the first minute (CUM_DL_60 s). The TDR_MED and the SDR_DL features can be representative of the downlink data rate and, hence, can be used to capture information about the available bandwidth. The D2U_MED feature can represent the downlink to uplink data ratio and is, therefore, likely to be a higher value when the video quality is high (and vice-versa). Finally, the CUM_DL_60 s feature can represent the data downloaded in the beginning of the session when the video buffer can be low and when a session can be more likely to suffer if the network conditions are poor. Differences between key features are found across the streaming services. For example, it is found that 8 features only appear in one out of the three services. It is believed that this effect is likely due to differences in design and TLS transaction mechanisms across the streaming services. In one or more embodiments, in addition to session level metrics, such as duration and downlink data rate, the ML-based QoE model can also detect differences in patterns within the TLS transactions of a video session based on the session QoE. A ML-based approach can learn these patterns to identify low QoE sessions.

The QoE estimation accuracy for the ML-based QoE can be compared with the QoE estimation capabilities when using packet trace data. To make this comparison, the fine-granular QoE metrics within a session can be converted to per-session QoE metrics using, for example, an algorithm that estimates per-session metrics using features corresponding to video segments along with network metrics such as retransmissions and RTT. Referring now to FIG. 2Q, the accuracy metrics for the QoE model using TLS transaction data are presented with respective gains for QoE metrics derived from packet trace data in parenthesis. It is found that using packet trace data to estimate QoE metrics results in an improvement of 5%-7% in overall accuracy and 4%-9% in recall for low combined QoE when compared to estimating QoE metric via TLS transaction data. This is intuitive, as packet traces are highly fine-granular and can be used to derive information about video segments downloaded in a session which are fundamental to HAS and its QoE. However, when the associated memory and computation overhead is taken into consideration, the margin gains in accuracy and recall for a data packet-based approach are clearly not justified. For example, in the training dataset, the average number of packets per session in the Svc1 service are 27,689 as compared to only 19.5 TLS transactions. The total computation time used for extracting relevant features from all Svc1 service sessions using packet data is around 503 seconds as compared to only 8.3 seconds using TLS transaction data. The difference in memory and computation time is found to be a factor of 60. Therefore, while packet trace data can provide higher accuracy than the TLS transaction data, the additional computation and memory overhead is found to be generally unjustified when compared to the marginal improvement in accuracy and recall except for situations. However, in one or more embodiments, an ISPs could implement adaptive monitoring, wherein coursegranular network data (TLS) data can typically be used for wide-scale monitoring and detection of problems, and, if a problem is detected, then fine-granular network data (packet trace) data can be collected and analyzed for greater accuracy.

In one or more embodiments, a session identification heuristic can be used to identify back-to-back video sessions. A back-to-back video session occurs when a streaming service provides a second video to a user immediately after (or prior to the end of) a first video. It is found that session identification using TLS data can be a challenge for back-to-back sessions due to overlapping of TLS transactions. However, a heuristic for session detection can be based on the following two insights: (1) the beginning of a session is typically characterized by more than one TLS transaction, and (2) the set of servers serving content typically change when a new session begins. Thus, for each TLS transaction, the set of succeeding transactions starting within W seconds can be tracked by the QoE model. The QoE model can calculate N, as the number of transactions in the set transaction, and $\delta$, as the percentage of transactions with a different server than the set of servers seen in the current session. A transaction can then be considered to start a new session (i.e., not a back-to-back session), if N and $\delta$ are greater than Nmin and $\delta$min, respectively. For example, the following parameter value can be used: W=3 seconds, Nmin=2, and $\delta$min=0.5.

Referring now to FIG. 2R, a confusion matrix is shown for Svc1 service sessions, where the beginnings of these session are correctly identified for 89% of the sessions. By contrast, if a timeout-based heuristic had been used to detect the beginnings of session, then the QoE model would have considered all these incidents as a single session as all these sessions were streamed back-to-back. This example may by an extreme case in comparison to real-world scenario. It is found that session identification techniques need to be designed for the specific network data. The transaction arrival and server request pattern can enable accurate session identification for TLS transaction data. It is, therefore, found that coarse-grained, but readily available, TLS transaction data can be used to estimate video QoE with reasonable accuracy and low overhead. The predictive capability can be attributed to two factors: (1) downlink data-related features that capture network quality and (2) differences in TLS transaction statistics for low and high QoE sessions.

Figure 2S:
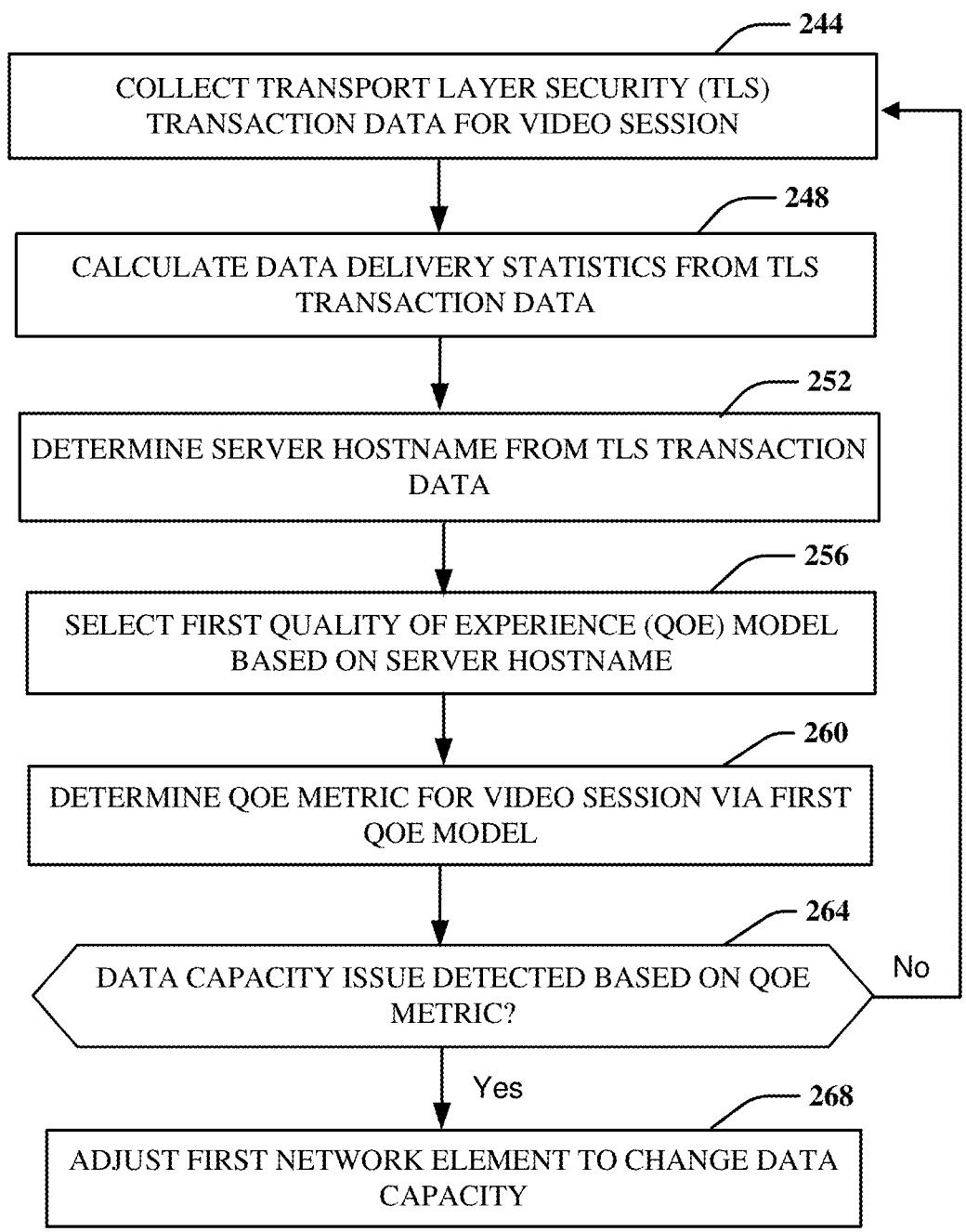
FIG. 2S depicts an illustrative embodiment of a method in accordance with various aspects described herein.

FIG. 2S depicts an illustrative embodiment of a method 240 in accordance with various aspects described herein. While for purposes of simplicity of explanation, the respective processes are shown and described as a series of blocks in FIG. 2S, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. At step 244, a QoE analyzer can collect TLS transaction data for a video session streamed to a user device by a streaming service. At step 248, the QoE analyzer can calculate data delivery statistics from the TLS transaction data. At step 252, the QoE analyzer can determine a server hostname for a streaming service from the TLS transaction data by reading unencrypted header data in a TLS transaction.

At step 256, the QoE analyzer can select a QoE model based on the server hostname. At 260, the QoE analyzer can determine one or more QoE metrics for the video session using the QoE model. At step 264, the QoE analyzer can detect if there is a data capacity issue in the network base on a QoE metric, and, if so, then the QoE analyzer can adjust a network element to change the data capacity, in step 268.

While for purposes of simplicity of explanation, the respective processes are shown and described as a series of blocks in FIG. 2S, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of system 100, the subsystems and functions of system 200, and method 230 presented in FIGS. 1, 2A, 2B, and 3. For example, virtualized communication network 300 can facilitate in whole or in part determining a QoE metric for a video session based on TLS transaction data. TLS transaction data for a video session delivered over a network can be collected. Data delivery statistic can be calculated from the TLS transaction data. A server hostname of a streaming service can be determined from the TLS transaction data and can be used to select a QoE model. A QoE metric can be determined for the video session from the data delivery statistics via the first QoE model. The QoE metric can be used to detect a data capacity issue for the network during the video session. A first network element of the network can be adjusted based on the data capacity issue.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc.

For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic, so the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
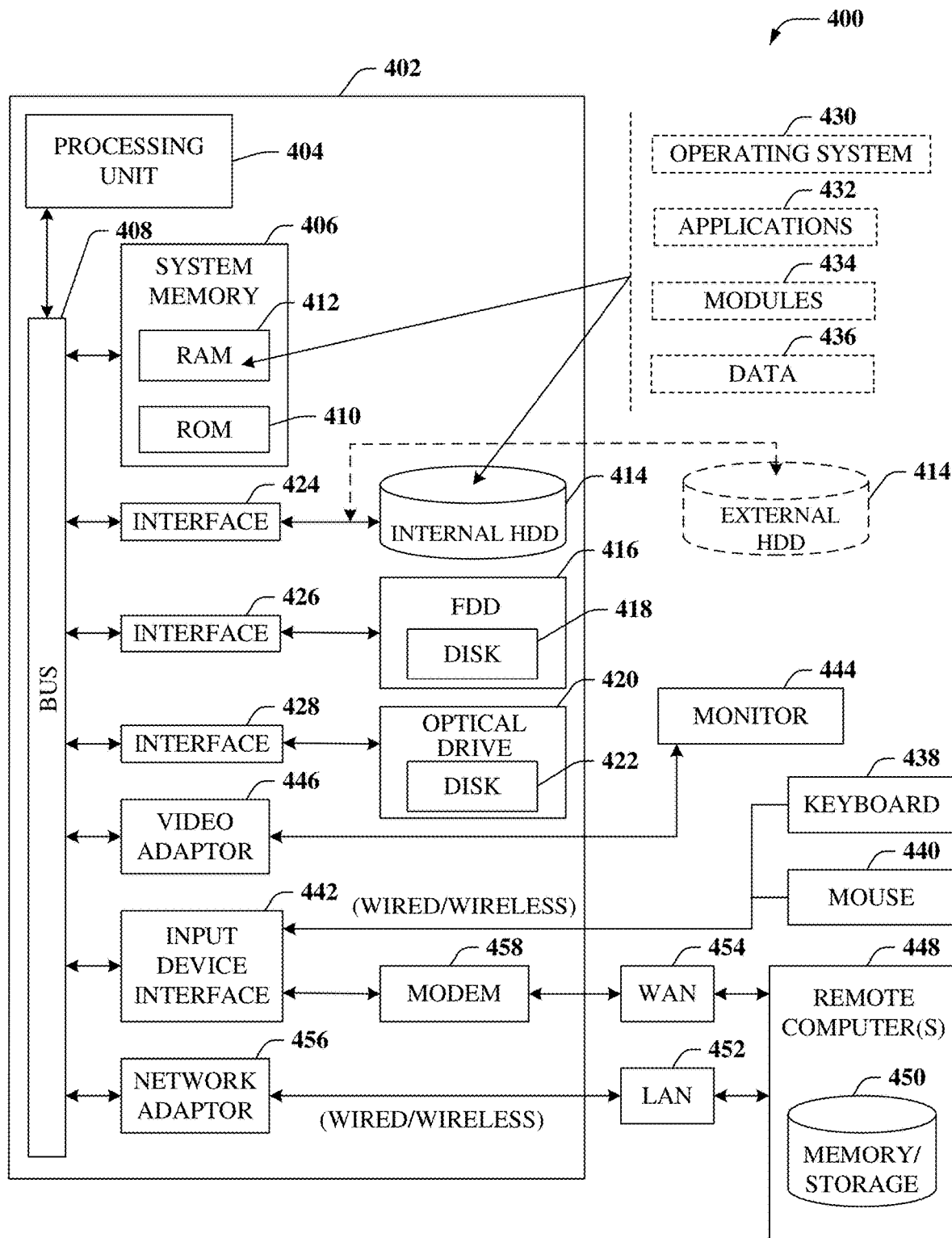
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining a QoE metric for a video session based on TLS transaction data. TLS transaction data for a video session delivered over a network can be collected. Data delivery statistic can be calculated from the TLS transaction data. A server hostname of a streaming service can be determined from the TLS transaction data and can be used to select a QoE model. A QoE metric can be determined for the video session from the data delivery statistics via the first QoE model. The QoE metric can be used to detect a data capacity issue for the network during the video session. A first network element of the network can be adjusted based on the data capacity issue.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices. Other examples of computing systems include wearable device, such as smart glasses, personal monitoring devices, and virtual reality goggles.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a wearable device, such as smart glasses, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out, anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
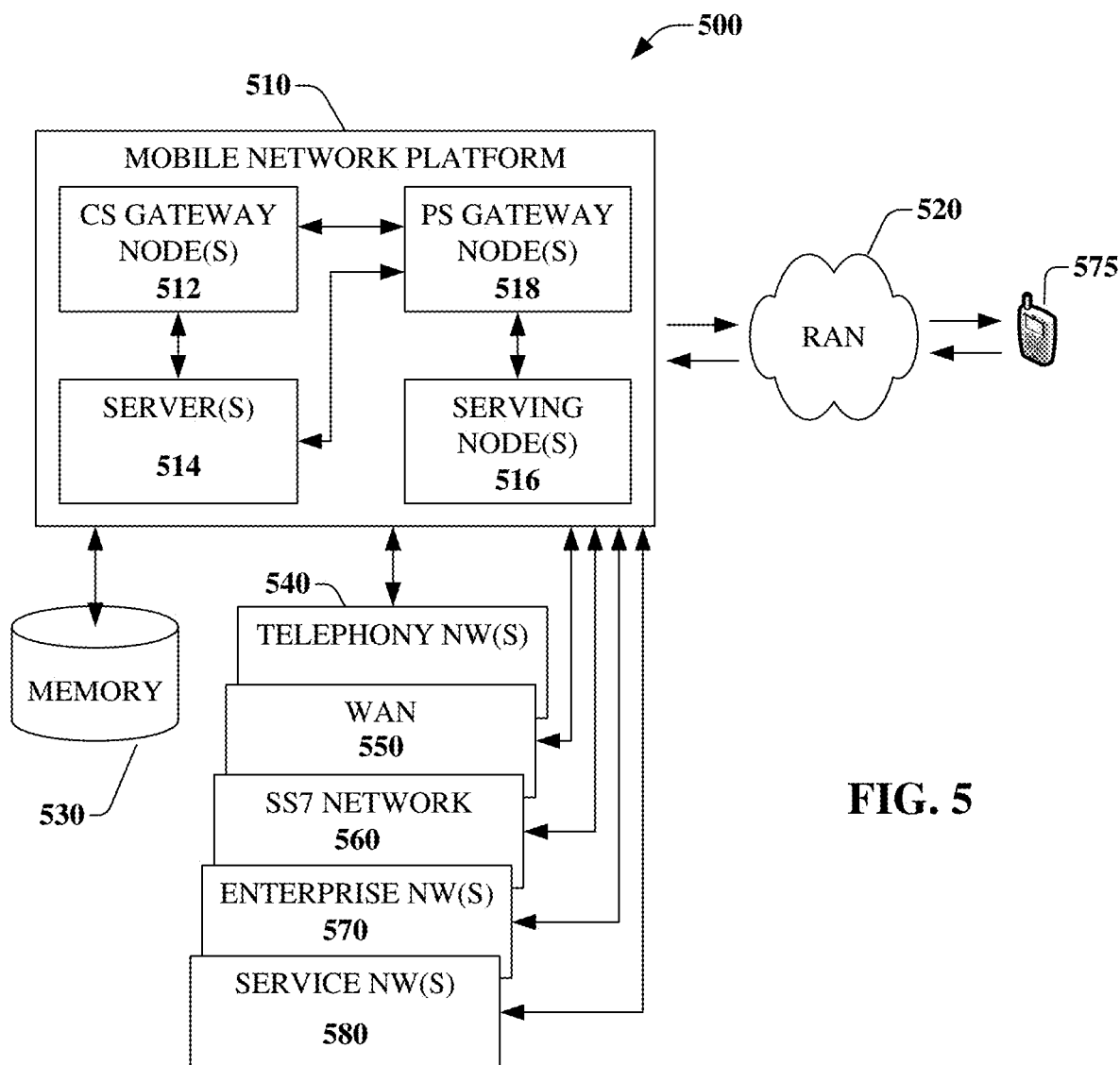
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining a QoE metric for a video session based on TLS transaction data. TLS transaction data for a video session delivered over a network can be collected. Data delivery statistic can be calculated from the TLS transaction data. A server hostname of a streaming service can be determined from the TLS transaction data and can be used to select a QoE model. A QoE metric can be determined for the video session from the data delivery statistics via the first QoE model. The QoE metric can be used to detect a data capacity issue for the network during the video session. A first network element of the network can be adjusted based on the data capacity issue.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
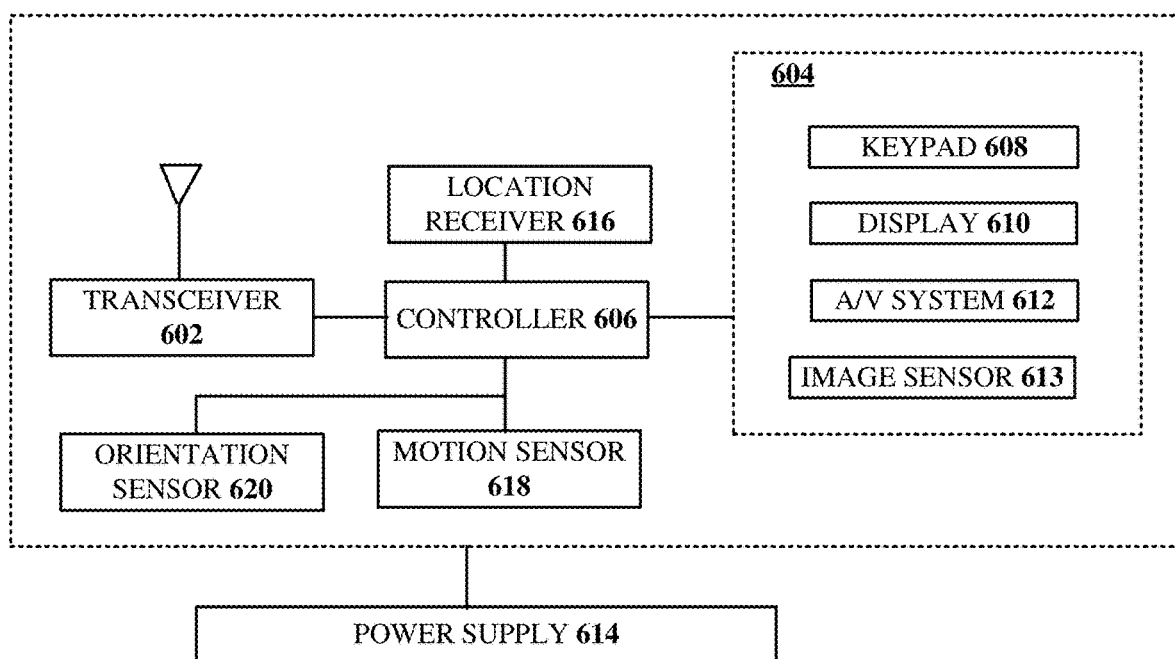
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining a QoE metric for a video session based on TLS transaction data. TLS transaction data for a video session delivered over a network can be collected. Data delivery statistic can be calculated from the TLS transaction data. A server hostname of a streaming service can be determined from the TLS transaction data and can be used to select a QoE model. A QoE metric can be determined for the video session from the data delivery statistics via the first QoE model. The QoE metric can be used to detect a data capacity issue for the network during the video session. A first network element of the network can be adjusted based on the data capacity issue.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

collecting, by a processing system including a processor, transport layer security (TLS) transaction data associated with a video session transmitted over a network;

calculating, by the processing system, a plurality of data delivery statistics from the TLS transaction data associated with the video session transmitted over the network, wherein the plurality of data delivery statistics includes session-level statistics over the video session, transaction-level statistics over each transaction, and temporal feature statistics over intervals of the video session;

determining, by the processing system, from the TLS transaction data, a server hostname of a first server associated with the video session;

determining, by the processing system, a percentage of transactions in the TLS transaction data that are associated with a second server other than the first server associated with the video session;

determining, by the processing system, whether the percentage of transactions in the TLS transaction data associated with the second server other than the first server associated with the video session exceeds a percentage threshold;

disabling, by the processing system, quality of experience (QoE) analysis associated with first server associated with the video session responsive to the determining the percentage of transactions in the TLS transaction data associated with the second server other than the first server exceeds the percentage threshold; and enabling, by the processing system, the QoE analysis associated with the first server associated with the video session responsive to the determining the percentage of transactions in the TLS transaction data associated with the second server other than the first server does not exceed the percentage threshold, wherein the enabling the QoE analysis further comprises:

selecting, by the processing system, a first QoE model according to the server hostname of the first server;

determining, by the processing system, a QoE metric for the video session from the plurality of data delivery statistics from the TLS transaction data associated with the video session according to the first QoE model, wherein the QoE metric comprises a low level of QoE or a high level of QoE, and wherein the first QoE model is trained via machine learning;

detecting, by the processing system, a data capacity issue for the network during the video session according to the determining the QoE metric; and adjusting, by the processing system, a first network element of the network responsive to the determining the data capacity issue for the network, wherein the first network element includes a first virtual network element, wherein the adjusting the first network element comprises instantiating a second virtual network element.

2. The method of claim 1, wherein the second virtual network element is instantiated from a common resource pool including a plurality of virtual network elements.

3. The method of claim 1, wherein the collecting is further via a transparent proxy.

4. The method of claim 1, wherein the determining the server hostname of the first server associated with the video session further comprises reading, by the processing system, a server name indicator field in an unencrypted TLS header of the TLS transaction data.

5. The method of claim 1, further comprising identifying, by the processing system, the video session according to a session identification heuristic.

6. The method of claim 1, further comprising:

determining, by the processing system, a number of transactions in the TLS transaction data; and determining, by the processing system, whether the number of transactions in the TLS transaction data exceeds a transaction threshold, wherein the disabling the QoE analysis is further responsive to the determining the number of transactions in the TLS transaction data exceeds the transaction threshold, and wherein the enabling the QoE analysis is further responsive to the determining the number of transactions it the TLS transaction data does not exceed the transaction threshold.

7. The method of claim 1, wherein the session-level statistics include downlink session data rate, uplink session data rate, session duration, TLS transactions per second, or any combination thereof.

8. The method of claim 1, wherein the transaction-level statistics include downlink size, uplink size, duration, transaction data rate, inter-arrival time, or any combination thereof.

9. The method of claim 1, wherein the temporal features statistics include cumulative downlink data, cumulative uplink data, or any combination thereof.

10. The method of claim 1, further comprising training, by the processing system, the first QoE model by comparing a plurality of QoE metrics for a plurality of video sessions to a plurality of ground-truth re-buffering data and video resolution data for the plurality of video session.

11. A device, comprising a processing system including a processor; and a memory that stores executable instructions that, when executed by the processing system, facilitate performance of operations, the operations comprising:

calculating a plurality of data delivery statistics from transport layer security (TLS) transaction data associated with a video session transmitted over a network, wherein the plurality of data delivery statistics includes session-level statistics over the video session, transaction-level statistics over each transaction, and temporal feature statistics over intervals of the video session;

determining, from the TLS transaction data associated with the video session, a server hostname of a first server associated with the video session;

determining a percentage of transactions in the TLS transaction data that are associated with a second server other than the first server associated with the video session;

determining whether the percentage of transactions in the TLS transaction data associated with the second server other than the first server associated with the video session exceeds a percentage threshold;

disabling quality of experience (QoE) analysis associated with first server associated with the video session responsive to the determining the percentage of transactions in the TLS transaction data associated with the second server other than the first server exceeds the percentage threshold; and enabling the QoE analysis associated with the first server associated with the video session responsive to the determining the percentage of transactions in the TLS transaction data associated with the second server other than the first server does not exceed the percentage threshold, wherein the enabling the QoE analysis further comprises:

selecting a first QoE model according to the server hostname of the first server;

determining a QoE metric for the video session from the plurality of data delivery statistics from the TLS transaction data associated with the video session according to the first QoE model, wherein the QoE metric comprises a low level of QoE or a high level of QoE; and adjusting a first network element of the network responsive to the determining the QoE metric for the video session, wherein the first network element includes a first virtual network element, and wherein the adjusting the first network element comprises instantiating a second virtual network element.

12. The device of claim 11, wherein the first QoE model is trained via machine learning.

13. The device of claim 11, wherein the operations further comprise determining a data capacity issue for the network during the video session according to the QoE metric, and wherein the adjusting the first network element of the network further comprises modifying a configuration of the first network element, modifying a data path of the first network element, or a combination thereof.

14. The device of claim 11, wherein the operations further comprise inspecting unencrypted TLS headers of the TLS transaction data via a transparent proxy.

15. The device of claim 11, wherein the operations further comprise:
   determining, by the processing system, a number of transactions in the TLS transaction data; and
   determining, by the processing system, whether the number of transactions in the TLS transaction data exceeds a transaction threshold, wherein the disabling the QoE analysis is further responsive to the determining the number of transactions in the TLS transaction data exceeds the transaction threshold, and wherein the enabling the QoE analysis is further responsive to the determining the number of transactions it the TLS transaction data does not exceed the transaction threshold.

16. The device of claim 11, wherein the session-level statistics include downlink session data rate, uplink session data rate, session duration, TLS transactions per second, or any combination thereof, wherein the transaction-level statistics include downlink size, uplink size, duration, transaction data rate, inter-arrival time, or any combination thereof, and wherein the temporal features statistics include cumulative downlink data, cumulative uplink data, or any combination thereof.

17. The device of claim 11, wherein the operations further comprise training the first QoE model by comparing a plurality of QoE metrics for a plurality of video sessions to a plurality of ground-truth re-buffering data and video resolution data for the plurality of video session.

18. A non-transitory machine-readable medium, comprising executable instructions that, when executed by a processing system including a processor, facilitate performance of operations, the operations comprising:
   calculating a plurality of data delivery statistics from transport layer security (TLS) transaction data associated with a video session transmitted over a network, wherein the plurality of data delivery statistics includes session-level statistics over the video session, transaction-level statistics over each transaction, and temporal feature statistics over intervals of the video session;
   determining a percentage of transactions in the TLS transaction data that are associated with a second server other than a first server associated with the video session;
   determining whether the percentage of transactions in the TLS transaction data associated with the second server other than the first server associated with the video session exceeds a percentage threshold;
   disabling quality of experience (QoE) analysis associated with first server associated with the video session responsive to the determining the percentage of transactions in the TLS transaction data associated with the second server other than the first server exceeds the percentage threshold; and
   enabling the QoE analysis associated with the first server associated with the video session responsive to the determining the percentage of transactions in the TLS transaction data associated with the second server other than the first server does not exceed the percentage threshold, wherein the enabling the QoE analysis further comprises:
      selecting a first QoE model according to a server hostname of the first server determined according to the TLS transaction data associated with the video session transmitted over the network;
      determining a QoE metric for the video session from the plurality of data delivery statistics from the TLS transaction data associated with the video session according to the first QoE model; and
      adjusting a first network element of the network responsive to the determining the QoE metric for the video session, wherein the first network element includes a first virtual network element, and wherein the adjusting the first network element comprises instantiating a second virtual network element.

19. The non-transitory machine-readable medium of claim 18, wherein the first QoE model is trained via machine learning, and wherein the operations further comprise collecting the TLS transaction data via a transparent proxy.

20. The non-transitory machine-readable medium of claim 18, wherein the server hostname is further determined by reading a server name indicator field in an unencrypted TLS header of the TLS transaction data.

* * * * *